United States Patent [19]

Grüner

[11] 3,982,795
[45] Sept. 28, 1976

[54] MULTI-CIRCUIT AIR-BRAKE SYSTEM, IN PARTICULAR FOR MOTOR VEHICLES

[75] Inventor: Hans Grüner, Edingen, Germany

[73] Assignee: Graubremse GmbH, Heidelberg, Germany

[22] Filed: Dec. 22, 1975

[21] Appl. No.: 643,087

Related U.S. Application Data

[63] Continuation of Ser. No. 470,168, May 15, 1974, abandoned.

[30] Foreign Application Priority Data

May 17, 1973 Germany............................ 2324873

[52] U.S. Cl................................. 303/52; 303/84 R
[51] Int. Cl.² ........................................ B60T 15/08
[58] Field of Search ............... 303/7, 50, 40, 52, 54, 303/84 A, 84 R, 2, 13

[56] References Cited
UNITED STATES PATENTS

| | | | |
|---|---|---|---|
| 3,016,271 | 1/1962 | Alfieri........................... | 303/54 X |
| 3,093,421 | 6/1963 | Euga............................. | 303/40 X |
| 3,095,246 | 6/1963 | Alfieri........................... | 303/40 |
| 3,456,991 | 7/1969 | Valentine et al. ............ | 303/40 X |

*Primary Examiner*—Duane A. Reger

[57] ABSTRACT

A compressed air supply system, including a compressor and a pressure regulator, is coupled to a multi-circuit brake valve. Each circuit of this multi-circuit brake valve includes a double valve and an associated safety valve positioned in coaxial relationship therewith. The safety valves are each coupled to an associated supply tank and are coupled in common to the compressed air supply system by a spring-loaded needle valve.

11 Claims, 6 Drawing Figures

MULTI-CIRCUIT AIR-BRAKE SYSTEM, IN PARTICULAR FOR MOTOR VEHICLES

This is a continuation of application No. 470,168, filed May 15, 1974, now abandoned.

BACKGROUND OF THE INVENTION

The present invention relates to a multi-circuit air-brake system, in particular for motor vehicles, with compressed-air supply means, safety valves in a number equal to the number of circuits, supply tanks in a number equal to the number of circuits, and a multi-circuit brake valve connected between the supply tanks and the brake lines. Air brake systems of this type have been previously known from German Pat. No. 1,176,500 and German Pat. No. 1,175,095. Each safety valve is incorporated in a line coming from a pressure regulator of the compressed-air supply means, with individual lines in a number corresponding to the number of circuits leading from the safety valves to different supply tanks. The safety means of each safety valve comprises essentially a spring-loaded piston-like control element so that to make the safety means of the safety valve open each pressure supplied by the compressed-air supply means must first overcome the spring pressure.

Considering that safety valves of the prior art, which may also have a multi-circuit design, are incorporated in a line between the pressure regulator and the supply tanks, it is obvious to one skilled in the art that a simplified construction, may be obtained by designing these safety valves to form a part of either the pressure regulator or the supply tanks. German laid-open Patent Application No. 2,233,144 suggests, for instance, a pressure regulator including a safety valve. However, this arrangement offers the disadvantage that separate lines must be provided to connect each individual supply tank with the pressure regulator and the safety valve incorporated therein.

The above described safety valves are intended to protect brake circuits associated with the tractor and/or the trailer of a motor truck-trailer type of vehicle. German laid-open Patent Application No. 2,127,833 discloses an arrangement in which a safety valve is incorporated in the trailer control valve in order to protect the trailer brake circuit.

SUMMARY OF THE INVENTION

An object of the present invention is to overcome the disadvantages of the prior art and to provide multi-circuit air-brake system of the type described above having a simplified structure and a reduced number of lines. Another object of the present invention is to prevent the control elements of the safety valves from being exposed to the undamped pressure pulses of the compressed-air supply means prior to the opening action.

These objects are accomplished according to the preferred embodiments of the present invention by providing a multi-circuit air-brake system characterized in that the compressed-air supply means are directly connected to the multi-circuit brake valve and that the safety valves are incorporated in or attached to the multi-circuit brake valve. This results in an especially simple structure of the whole air-brake system since the multi-circuit brake valve must in any case be provided and since the additional processing required for incorporating or attaching the safety valves does not cause excessive costs or trouble. Further, an essential advantage of this arrangement is that the lines leading from individual supply tanks to the multi-circuit brake valve may be used both as supply and discharge lines for the compressed air so that separate supply and discharge lines previously used between the safety valves and the supply tanks can be eliminated.

As a general rule, it is advisable to incorporate the safety valves in the multi-circuit brake valve, i.e. to combine the safety valves within the housing of the multi-circuit brake valve. This arrangement offers the particular advantage that the connection between the multi-circuit brake valve and the pressure regulator of the compressed-air supply means may also consist of only one line. However, it is also possible to attach the safety valves to the multi-circuit brake valve and to connect all the safety valves with the pressure regulator via one common branched line. This arrangement, also, eliminates the connection lines between the safety valves and the supply tanks heretofore necessary.

Particular advantages are offered by an arrangement in which each safety valve is combined with the multi-circuit brake valve and arranged within the housing of the multi-circuit brake valve in coaxial relation to an associated group of inlet and outlet valves of a respective circuit of the multi-circuit brake valve. such an arrangement simplifies the production of the individual cylinders of the multi-circuit brake valve and facilitates the assembly work. In addition, it permits the group of inlet and outlet valves and the control member of the safety valve of each circuit of the multi-circuit brake valve to be designed as an exchangeable unit that can be inserted into the housing of the multi-circuit brake valve. Conveniently, the inlet seat of each circuit of the multi-circuit multi-circuit brake valve has a diameter smaller than the diameter of the control element of each safety valve. The brake valve may be conventionally vented from above. It may also be very simply vented from below by providing each group of inlet and outlet valves with a hollow double valve body guided in sealing relationship within the control element of the associated safety valve.

The multi-circuit brake valve may most advantageously have a common connection between the safety valves and the compressed-air supply means. A needle valve may be arranged within the common connection of all the safety valves for the purpose of protecting the control elements of the safety valves against pressure pulses from the compressor of the compressed-air supply means or for the purpose of reducing the effects of such pressure pulses. The needle valve is conveniently loaded by an adjustable spring, and the body of the needle valve is formed of a piston subject to the action of the introduced compressed air so that the needle valve will be active only in the lower pressure range while in the upper pressure range the passage to the control elements of the safety valves will be completely free.

BRIEF DESCRIPTION OF THE DRAWINGS

It is obvious that the perferred embodiments of the present invention may be varied in many ways without leaving the idea and the scope of the present invention, which will be described hereafter with reference to the attached drawings in which.

DETAILED DESCRIPTION OF THE PREFERRED EMBODIMENTS

Figure 1:
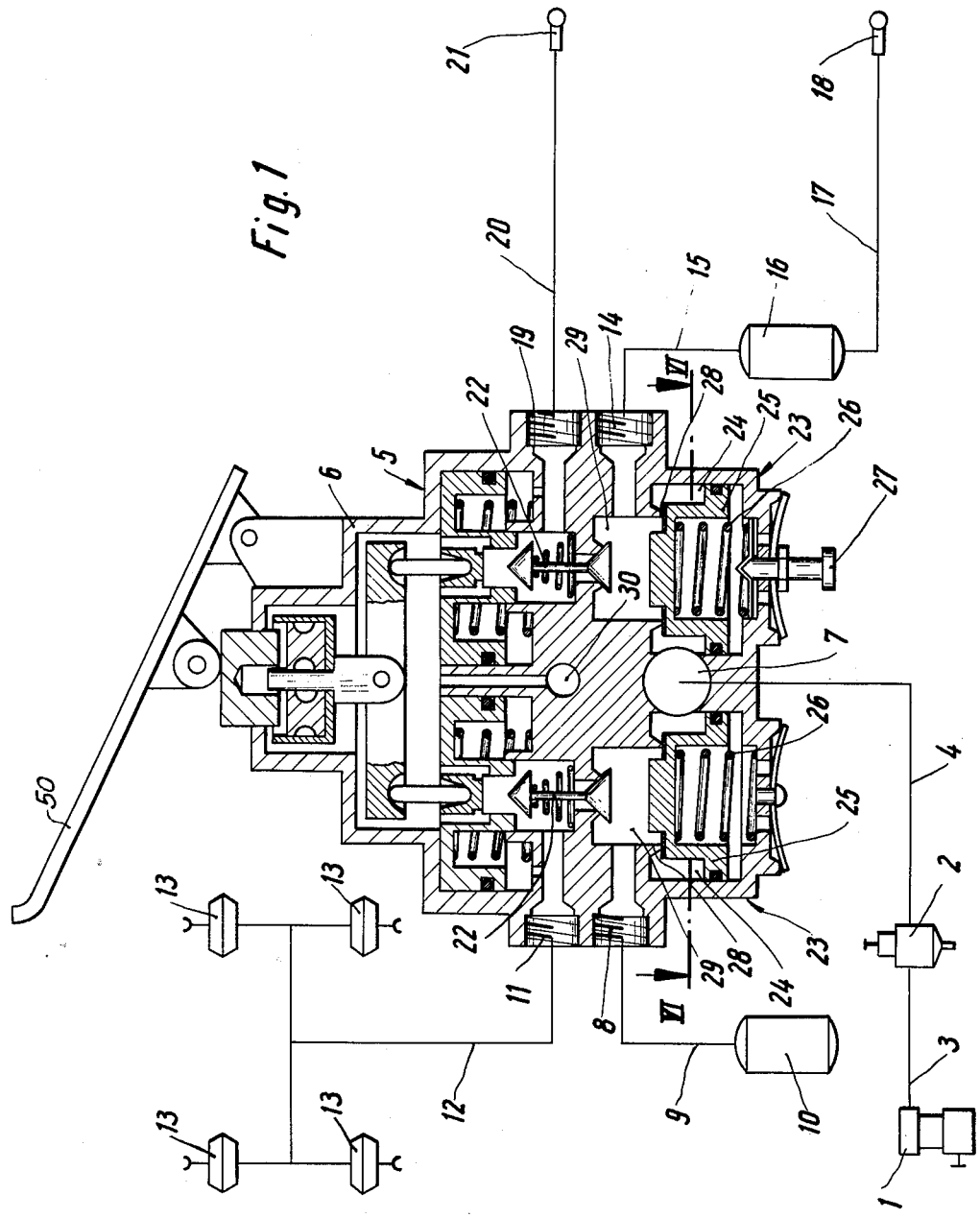
FIG. 1 shows a cross-sectional view of a multi-circuit brake valve incorporated in an air-brake system according to one of the preferred embodiments of the present invention.

Referring now to FIG. 1, there is shown a multi-circuit air-brake system having compressed-air supply means comprising essentially a compressor 1 and a pressure regulator 2, which are interconnected via a line 3. A line 4 leads from the pressure regulator 2 to a multi-circuit brake valve 5, having a housing 6. The line 4 is connected to the multi-circuit brake valve 5 via a connection 7. The housing 6 of the multi-circuit brake valve 5 includes a connection 8, from which a line 9 leads to a supply tank 10 for a first circuit of the air brake system. For braking purposes, compressed air is supplied through a connection 11 and a brake line 12 to a plurality of brake cylinders 13. A line 15 leads from a connection 14 to a supply tank 16 for a second circuit of the air brake system, and a supply line 17 interconnects the supply tank 16 with a hose coupling 18. From a connection 19 a brake line 20 leads to another hose coupling 21.

The multi-circuit brake valve 5 has a top portion of conventional design comprising two conventional double valve bodies 22, each serving together with portions of the housing 6 and other moving parts to form a valve group comprising an inlet valve and an outlet valve for an associated different one of the first and second circuits of the air-brake system. Arranged in coaxial relation to each valve group of each circuit is an associated safety valve 23 comprising essentially a compression chamber 24 provided in the housing 6 of the multi-circuit brake valve 5 and a piston 25 guided in the compression chamber 24 in sealing relationship therewith. Each piston 25 is supported by a spring 26, the spring load of which is conveniently adjustable by means of a set screw 27. Together with an associated inwardly projecting rim 28 of 6, each housing, the piston 25 forms a gate valve for the compressed air. Arranged in coaxial relationship to the compression chamber 24 of each safety valve 23 is an associated chamber 29, which is connected to an associated different one of the connections 8 and 14. A channel 30 serves as a common vent for the multi-circuit brake valve 5.

Figure 2:
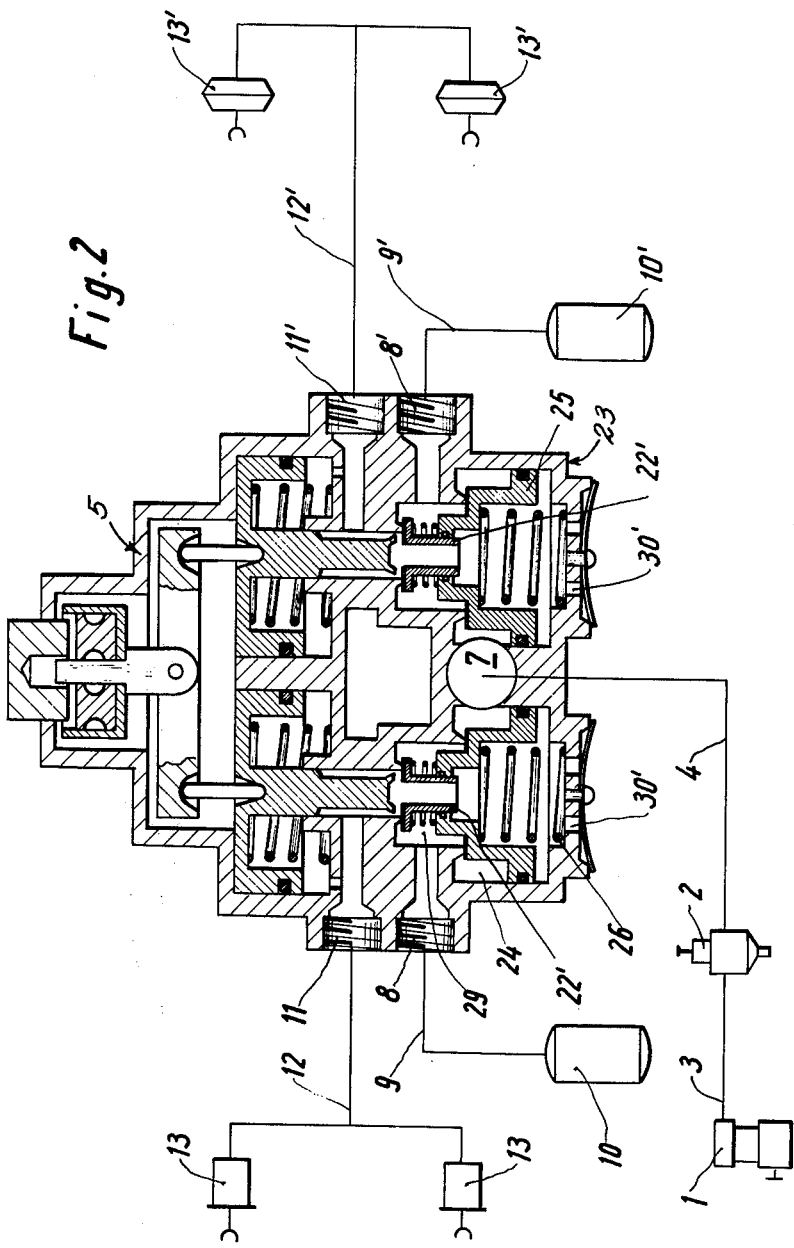
FIG. 2 shows a cross-sectional view of another multi-circuit brake valve incorporated in an air-brake similar to that shown in FIG. 1 according to another of the preferred embodiments of the present invention.

Referring to FIG. 2 there is shown a brake system corresponding essentially to the system of FIG. 1, but contrary to the latter comprising a genuine two-circuit brake system for a tractor alone. In this arrangement, a line 9' leads from a connection 8' of the multi-circuit brake valve 5 to a supply tank 10'. Likewise, a brake line 12' leads from a connection 11' of the multi-circuit brake valve 5 to a plurality of brake cylinders 13', which create a second braking circuit for the tractor alone. It is understood that this multi-circuit brake valve 5 may, for example, also take the form of a three-circuit brake valve. In this case, the third circuit would be used for a trailer. This function is performed by the second circuit of the brake valve 5 shown in FIG. 1.

The multi-circuit brake valve 5 of FIG. 2 has somewhat different double valve bodies 22' in that, the venting function is achieved by a hollow design of the double valve bodies, which are guided in sealing relationship within the pistons 25. The pistons 25 may also be described as control elements for the safety valves 23, channels 30' being provided for separate venting of each circuit of the multi-circuit brake valve 5.

Each of the multi-circuit brake systems shown in FIGS. 1 and 2 operates similarly as described below: In FIGS. 1 and 2, each brake system is shown in the position in which neither the brake nor the compressor 1 is in the operating position. The compressor 1 is operated, compressed air flows via line 3, pressure regulator 2, and line 4 to the connection 7 of the multi-circuit valve 5. When a pressure equal to the load of the springs 26 has built up in the compression chambers 24, which are all connected to the connection 7, the pistons 25 are displaced against the action of the springs 26 so that the gate valve will open and the compressed air will flow from the compression chambers 24 into the associated chambers 29 and so that corresponding ones of the supply tanks 10, 10', and 16 will be filled via corresponding ones of the connections 8, 8', and 14, respectively. As the brake is not being operated, the inlet valve of each circuit of the brake valve 5 is closed while the outlet valve of each circuit of the brake valve is in the open position. To operate the brake the brake pedal 50 is actuated, thereby closing the outlet valves at the double valve bodies 22 and opening the inlet valves in the manner generally known. Thus, compressed air is allowed to flow from the corresponding ones of the supply tanks 10, 10', and 16 via corresponding ones of the lines 9, 9', and 15 into the chambers 29 and from there via corresponding ones of the brake lines 12, 12', and 20 to the corresponding ones of the brake cylinders and hose coupling 13, 13', and 21, respectively. The springs 26 are adjusted to a safety pressure so that the safety valves 23 will remain in the open position during this phase. In the event of any of the circuits of the brake system becoming defective, as for instance by breakage of any of the lines 12, 12' or 20, the associated safety valve 23 will automatically close. Only when the adjusted safety pressure has been reached will the closed safety valve 23 open again, and then the air will escape into the atmosphere via the defective circuit so that the pressure regulator 2 will be prevented from operating.

Venting of the brake cylinders and 13 13' and/or the brake lines 12, 12', and 20 takes place when the brake is being released. In the arrangement shown in FIG. 1 this function is performed via the common vent formed by the channel 30, while in the arrangement of FIG. 2 each circuit is vented separately via the channels 30'. During this process, the safety valves 23 remain in their open positions so that an equalization of pressure may take place between the supply tanks of the different circuits.

Figure 3:
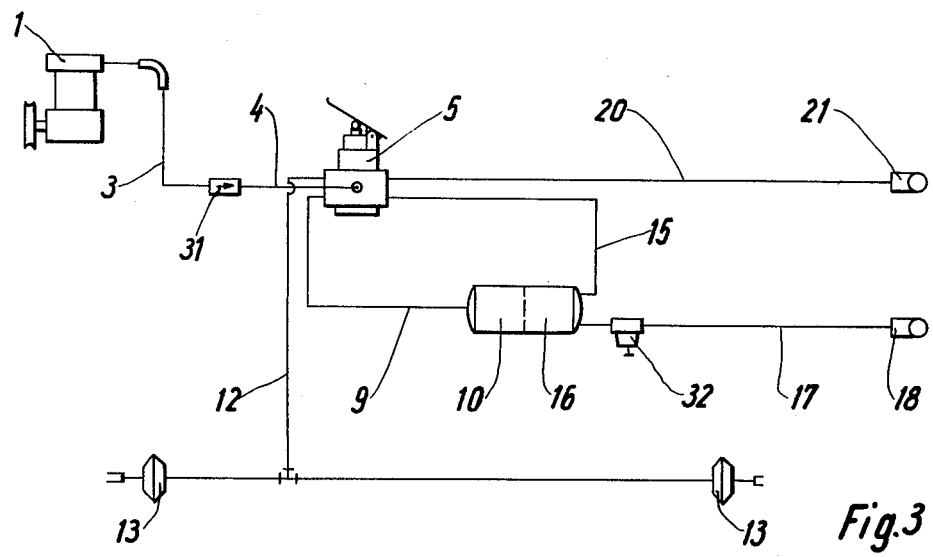
FIG. 3 shows a high-pressure air-brake system for a truck with a semi-trailer.

FIG. 3 shows a high-pressure air brake system with reduced pressure for the service brake of a truck and semi-trailer combination, this brake system uses a high-pressure compressor 1 with a self-stabilizing feature. Line 3–4 is provided with a check valve 31. Supply tanks 10 and 16 are set under high pressure. In the supply line 17 leading to the trailer, a pressure-relief valve or a pressure-reducing valve 32 is provided. The multi-circuit brake valve 5 is suitably designed to achieve a pressure reduction in the brake lines 12 and 20. In this case, also, the compressed air flows through lines 9 and 15 in both directions.

Figure 4:
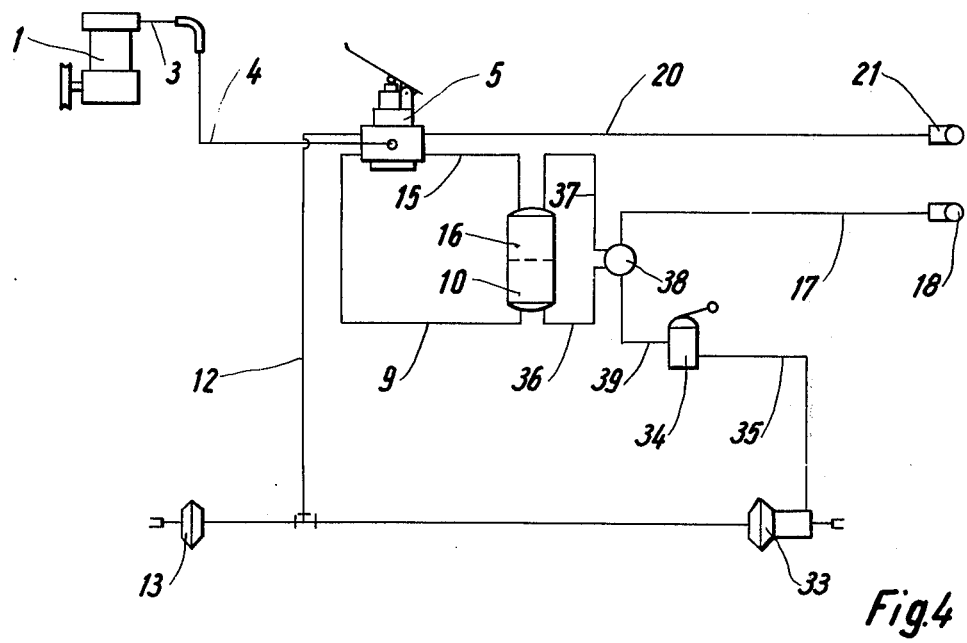
FIG. 4 shows an air-brake system similar to that shown in FIG. 3, but with a spring-loaded brake for the tractor of a motor truck trailer type of vehicle.

FIG. 4 shows an air brake system similar to that of FIG. 3, but in this case the tractor of the truck and semi trailer combination is provided with a diaphragm spring-loaded brake. Brake cyclinder 33 can be controlled on the one hand by the service brake via brake line 12 and on the other hand by means of the auxiliary and/or parking brake via hand brake valve 34 and a brake line 35. Lines 36 and 37 lead from the two supply tanks 10 and 16 to a multi-circuit pressure control valve 38 with a pressure relief feature and check means for the spring means of the control valve. Connected to control valve 38 is a line 39 leading to the hand brake valve 34. The supply line 17 with the hose coupling 18 is also connected to control valve 38. In this case, also, the safety valves 23 are incorporated into the multi-circuit brake valve 5 for protecting the two supply tanks 10 and 16. In addition, the multi-circuit brake valve 5 is united with the check valve 31 of FIG. 3.

Figure 5:
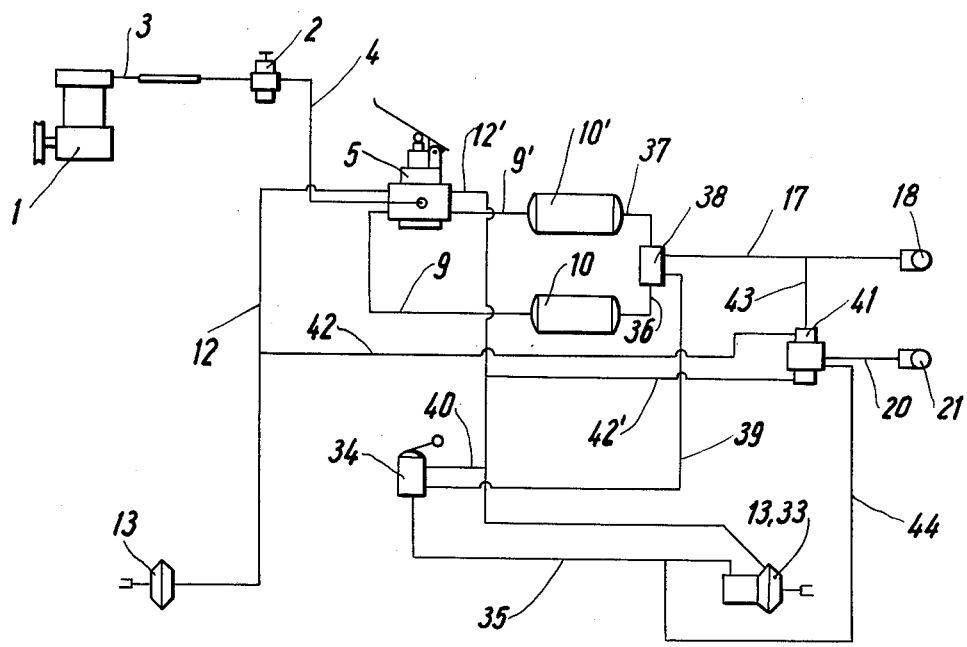
FIG. 5 shows another air-brake system for a truck and trailer combination.

The air-brake system shown in FIG. 5 comprises two brake circuits for the tractor of the truck and trailer conbination, an auxiliary hand or parking brake for the tractor and the supply line 17 and brake line 20 for the trailer brake. In this case, the multi-circuit pressure control valve 38 has no pressure relief feature. To prevent the pressures from summing up, the hand brake valve 34 has additional means for releasing the spring-loaded parking brake when the service brake is operated and the parking brake is simultaneously applied. For this purpose, the hand brake valve 34 is connected via a line 40 to the brake line 12'. A trailer control valve 41 is provided and connected to the brake lines 12 and, 12' via lines 42 and 42' respectively. The trailer control valve 41 takes the form of a relay and is connected to the supply line 17 via a line 43. In addition, there is provided a line 44, which leads to line 35 of the auxiliary hand or parking brake.

The operation of the various multi-circuit brake systems shown in FIGS. 3 through 5 is commonly known, however, these multi-circuit brake systems show very clearly that the line arrangements of the brake systems of the present invention are much simpler than the line arrangements of prior art multi-circuit brake systems.

Figure 6:
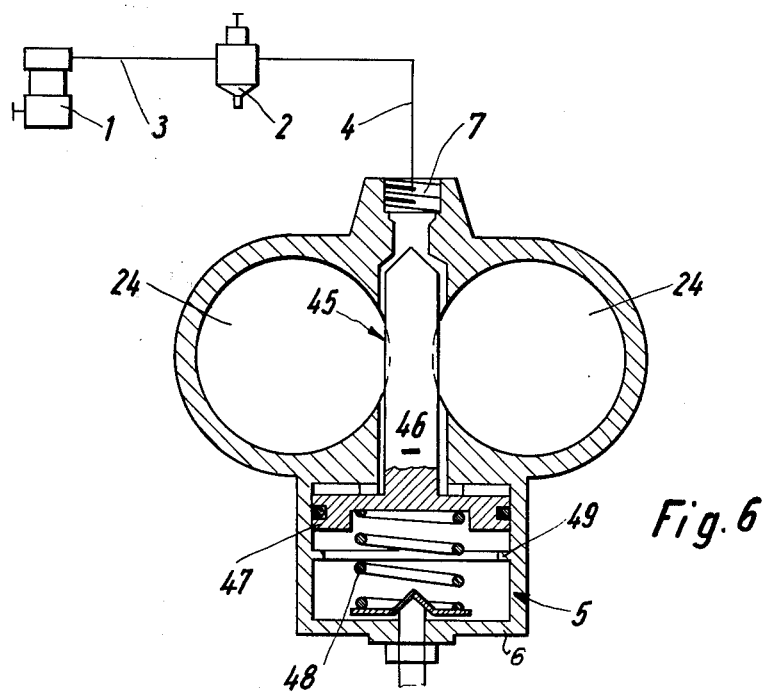
FIG. 6 shows a sectional view taken along the line VI—VI of the multi-circuit brake valve shown in FIG. 1.

FIG. 6 shows in particular a needle valve 45, which may be arranged within the common connection 7 of the safety valves 23 of a multi-circuit brake valve 5. This needle valve 45 comprises a needle 46 carrying a piston 47. The needle 46 and the piston 47 bear against the housing 6 of the mulit-circuit valve 5 via an adjustable spring 48. The needle valve 45 is provided with a reduced cross-section so that it damps the pressure pulses received from compressor 1. Accordingly, in the lower pressure range, the pressure pulses act upon the safety valves 23 and/or the compression chambers 24 only in the damped form. In the operating range, when the safety valves 23 are in their open position, the piston 47, which is subjected to the action of the flow of compressed air, is displaced against the action of spring 48 until it rests upon stops 49. When the piston 47 is in this position, the reduced cross-section of the needle valve 45 provides free passage for compressed air supplied by the compressed-air supply means, 1–2. This allows the compressed air to reach the open safety valves 23 undamped. In this manner, the safety valves 23 are prevented from performing the function of a switch in the lower pressure range.

I claim:

1. A multi-circuit brake system comprising a plurality of tanks for holding a fluid; a plurality of brake lines for applying fluid to braking apparatus of at least one vehicle; a brake valve including a housing defining a plurality of circuits each connected to an associated different one of the tanks and an associated different one of the brake lines, said brake valve further including valve means disposed in said circuits for controlling the flow of fluid from the tanks to the brake lines; supply means for supplying compressed fluid; and a plurality of safety valves each connected to an associated different one of the tanks via a portion of an associated different one of the circuits of the brake valve, said safety valves being directly connected in common to the supply means for controlling the flow of fluid from the supply means to the tanks; each of said safety valves including a piston and a spring mounted on one side of the piston for spring-biasing the piston against a projecting rim of the housing to close a fluid passage passing from the supply means along the opposite side of the piston and via a portion of the associated circuit of the brake valve to the associated tank, said projecting rim of the housing dividing the surface area of said opposite side of the piston into a first surface area under pressure of the fluid in the associated tank and a second surface area under pressure of the compressed fluid from the supply means whereby one or both of those pressures may bias the piston against the spring and away from the projecting rim of the housing to open said fluid passage.

2. A multi-circuit brake system as in claim 1 wherein said valve means of the brake valve comprises a plurality of valve groups each mounted within the housing in an associated different one of the circuits of the brake valve; and said safety valves are combined with the brake valve and are each mounted within the housing in coaxial relationship with an associated different one of the valve groups.

3. A multi-circuit brake system as in claim 2 wherein the piston of each of said safety valves is mounted for movement between the projecting rim of the housing and another spaced, oppositely-facing portion of the housing; and the spring by which the piston of each of said safety valves is spring-biased against the projecting rim of the housing is positioned between said one side of the piston and said other portion of the housing.

4. A multi-circuit brake system as in claim 3 wherein each of said valve groups includes a double valve body coaxially mounted above the piston of the associated safety valve and normally spring-biased against still another portion of the housing by a spring positioned between the last-mentioned portion of the housing and a spaced, oppositely-facing portion of the double valve body to close a fluid passage passing from the associated tank via the associated circuit and through the last-mentioned portion of the housing to the associated brake line.

5. A multi-circuit brake system as in claim 3 wherein each of said valve groups includes a double valve body coaxially mounted within an upper portion of the piston of the associated safety valve and normally spring-biased against still another portion of the housing above the piston by a spring positioned between the upper portion of the piston and a spaced, oppositely-facing portion of the double valve body to close a fluid passage passing from the associated tank via the associated circuit and through the last-mentioned portion of the housing to the associated brake line.

6. A multi-circuit brake system as in claim 1 wherein each circuit of said brake valve has an inlet for passing fluid from the associated tank to the associated brake line and for normally being engaged by the valve means of the brake valve to block the flow of fluid from the associated tank to the associated brake line; and each circuit of said brake valve has an inlet for passing fluid from the supply means to the associated tank and for normally being engaged by the piston of the associated safety valve to block the flow of fluid from the supply means to the associated tank.

7. A multi-circuit brake system as in claim 1 wherein said valve means of the brake valve comprises a plurality of double valve bodies each mounted in an associated different one of the circuits of the brake valve for normally blocking the flow of fluid from the associated tank to the associated brake line; the piston of each of said safety valves is spring-biased against the projecting rim of the housing for normally blocking the flow of fluid to the associated tank from the supply means; and each of said double valve bodies is coaxially mounted in and guided in sealing relationship with the piston of the associated safety valve and is provided with a fluid passage normally communicating with the associated brake line and a vent for the associated circuit of the brake valve.

8. A multi-circuit brake system as in claim 1 wherein said safety valves are combined with and incorporated in the brake valve; and said brake valve includes a common connection from the supply means to all of the safety valves.

9. A multi-circuit brake system as in clain 8 wherein said brake valve includes a needle valve mounted within the common connection from the supply means to all of the safety valves.

10. A multi-circuit brake system as in claim 9 wherein said needle valve is spring loaded by an adjustable spring positioned between a portion of the needle valve and a spaced, oppositely-facing portion of the brake valve.

11. A multi-circuit brake system as in claim 9 wherein said needle valve includes a needle-like portion and an adjoining piston-like portion of larger diameter mounted in the common connection from the supply means to the tanks for movement between spaced, oppositely-facing portions of the brake valve.

* * * * *